Aug. 6, 1929.	S. A. ERWIN	1,723,273
HOSE COUPLING AND NOZZLE CONNECTION
Filed Nov. 3, 1926
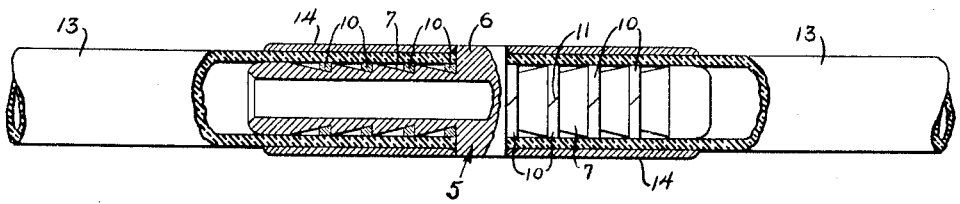
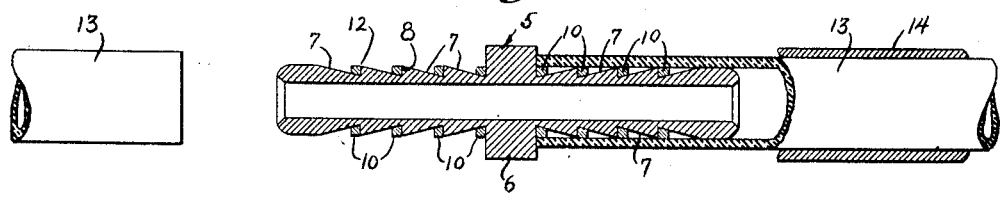
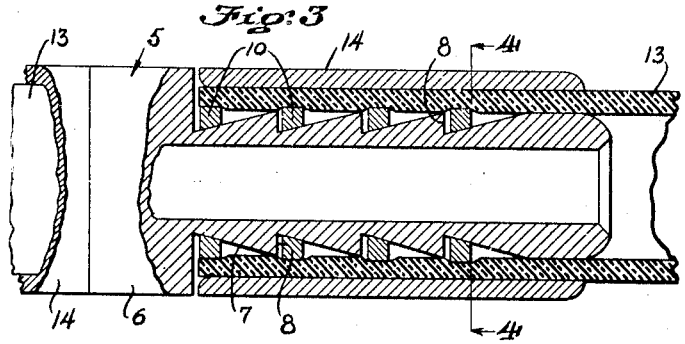 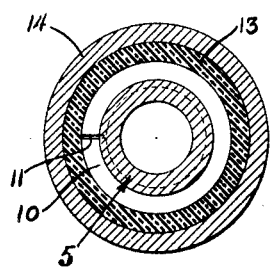
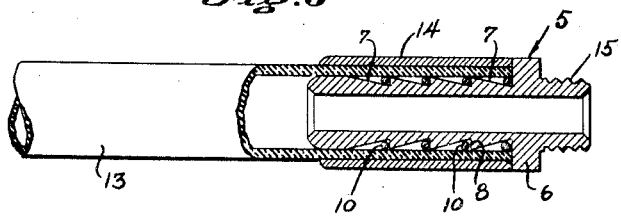 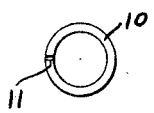
INVENTOR.
SHANNON A. ERWIN
BY
ATTORNEY.

Patented Aug. 6, 1929.

1,723,273

UNITED STATES PATENT OFFICE.

SHANNON ALFRED ERWIN, OF SANTA FE SPRINGS, CALIFORNIA, ASSIGNOR OF ONE-HALF TO EARL B. WIGGINS, OF LOS ANGELES, CALIFORNIA.

HOSE COUPLING AND NOZZLE CONNECTION.

Application filed November 3, 1926. Serial No. 145,957.

This invention relates to a novel form of coupling for flexible hoses, and hose nozzle connections.

A general object of the invention is to provide a hose coupling device which may be quickly and easily applied to hoses to couple two lengths together, or for connecting hose nozzles without employing hose clamps, screws, nipples, or other securing or fastening means now in common use.

A further object is to provide a device in which the hose coupling or nozzle member is held in rigid engagement with the hose to which applied solely by friction.

Other objects and advantages will be apparent from the following specification, reference being had to the drawings accompanying the same and forming a part thereof, in which:

Fig. 1 is a side elevation of a pair of hoses coupled together, partly in section.

Fig. 2 is a longitudinal section through the hose coupling showing a hose secured to one end, the other end with the hose removed.

Fig. 3 is an enlarged longitudinal section of one end of the coupling showing the hose frictionally clamped thereto.

Fig. 4 is a cross section taken on line 4—4 of Fig. 3.

Fig. 5 is a longitudinal section through a hose nozzle connection, showing another form of clamping ring.

Fig. 6 is a face view of one of the clamping rings.

In a practical embodiment of the coupling device 5 designates a tubular metal coupling member provided with a central hub or abutment 6, the exterior surface on either side being provided with a plurality of annular cone shaped serrations 7 tapering from their bases 8 inwardly towards the central hub 6 the reverse of similar hose connections now in general use. Encircling each serration are friction rings 10, each provided with an inclined split 11 in order that the same may be mounted in position on the conical surfaces of the serrations. These rings are preferably formed of spring metal, and of the cross sectional form shown in Fig. 3, the inner peripheral surface being tapered from one side of the ring to the other in order to correspond to the tapered surface of the serrations. In Fig. 5 the friction rings are circular in cross section in order to promote freedom of movement on the conical surfaces of the serrations when an outward pull is exerted on the coupling member when connected to a hose.

When the rings 10 have been mounted on the member 5 it will be a comparatively easy matter to force the same into the end of the hose as the rings will be forced against the bases 8 the outer peripheral surfaces lying flush with the edges 12 of the serrations. After the member 5 has been inserted in the hose 13 a short metal sleeve 14 mounted on the hose is drawn forwardly against the abutment 6, the internal diameter of the sleeve being slightly greater than the external diameter of the hose in order that the sleeve will at all times be in frictional sliding engagement therewith.

After the sleeve 14 has been drawn into position, as shown in Figs. 1 and 2, it will be apparent that when an outward pull is exerted on either of the hoses which are coupled together that the conical surfaces of the serrations of the members will cause a wedging action of the spring friction rings in the spaces formed between the conical surfaces of the serrations and the inner surfaces of the hoses, the metal sleeve serving to prevent a deformation of the hose walls, Fig. 3 illustrating graphically the action above described.

In Fig. 5 is illustrated the end of a hose provided with a single coupling member 5, provided at its hub end 6 with a threaded nipple 15 for the reception of a hose sprinkler nozzle. The construction and action of the coupling being exactly similar to the first described form.

From the above it will be apparent that I have provided a device, a simple highly efficient coupling device that eliminates the use of clamps, springs, and similar mechanisms, the coupling being held in frictionally tight engagement with the hose at all times until the metal sleeve is moved out of its operative position.

What I claim is:

1. A coupling of the character specified comprising in combination with an elastic hose, a hose engaging member having a plurality of conical external serrations, a split metal friction ring encircling each serration and movable thereon, and a metal sleeve movably mounted on the hose and surrounding the hose engaging member, whereby when a pull is exerted on the hose engaging member the friction rings will wedge in the spaces between the conical surfaces of the serrations and the elastic hose wall to hold the hose in frictional engagement with the hose member.

2. A coupling of the character specified comprising in combination with a hose, a hose engaging member having a plurality of conical surfaces, a metal wedging means movably mounted on each of said surfaces, and a sleeve slidably mounted on the hose and encircling that portion engaged by the hose engaging member.

3. A hose coupling construction comprising in combination with a hose, a tubular coupling member adapted to engage one end of the hose, the peripheral surface of said member being provided with a plurality of cone-shaped surfaces, the surfaces tapering from the forward end of said member rearwardly and outwardly, a plurality of movable wedging members, one for each cone shaped surface, and a movable sleeve member mounted on the hose and surrounding the coupling member.

In witness that I claim the foregoing I have hereunto subscribed my name this 28th day of September, 1926.

SHANNON ALFRED ERWIN.